(12) United States Patent
Sishtla

(10) Patent No.: US 6,632,077 B2
(45) Date of Patent: Oct. 14, 2003

(54) HYBRID BEARING ARRANGEMENT FOR CENTRIFUGAL COMPRESSOR

(75) Inventor: Vishnu M. Sishtla, Manlius, NY (US)

(73) Assignee: Carrier Corporation, Farmington, CT (US)

(*) Notice: Subject to any disclaimer, the term of this patent is extended or adjusted under 35 U.S.C. 154(b) by 13 days.

(21) Appl. No.: 10/044,533

(22) Filed: Jan. 11, 2002

(65) Prior Publication Data

US 2003/0133814 A1 Jul. 17, 2003

(51) Int. Cl.[7] .................. F04B 17/00; F04B 49/00
(52) U.S. Cl. .................. 417/423.6; 417/423.12; 417/63; 417/228
(58) Field of Search ............. 417/423.6, 423.1, 417/423.12, 423.13, 63, 228, 32

(56) References Cited

U.S. PATENT DOCUMENTS

| | | | | |
|---|---|---|---|---|
| RE33,142 E | * | 1/1990 | Sato et al. ............. 417/365 |
| 4,938,664 A | * | 7/1990 | Zinsmeyer ............. 417/83 |
| 5,266,002 A | * | 11/1993 | Brasz ............. 415/208.3 |
| 5,267,452 A | * | 12/1993 | Zinsmeyer et al. ............. 62/505 |
| 5,301,771 A | * | 4/1994 | Sishtla et al. ............. 184/6.16 |
| 5,540,575 A | * | 7/1996 | Takano et al. ............. 418/201.1 |
| 6,068,457 A | * | 5/2000 | Dewhirst ............. 417/423.6 |
| 6,220,749 B1 | * | 4/2001 | Wyker ............. 374/141 |

* cited by examiner

Primary Examiner—Charles G. Freay
Assistant Examiner—Michael K. Gray
(74) Attorney, Agent, or Firm—Wall Marjama & Bilinski LLP

(57) ABSTRACT

A centrifugal compressor that includes a low speed shaft connected to a drive motor and a high speed shaft containing an impeller. The high speed shaft is coupled to the low speed shaft by a gear train. The low speed shaft is supported by hydrodynamic, oil lubricated, bearings while the high speed shaft is supported by roller and ball bearings. Any vibrational stresses developed in the high speed shaft are dampened by the low shaft system through the gear train coupling.

16 Claims, 3 Drawing Sheets

HYBRID BEARING ARRANGEMENT FOR CENTRIFUGAL COMPRESSOR

FIELD OF THE INVENTION

This invention relates to a centrifugal compressor and, in particular, to a hybrid bearing arrangement for a centrifugal compressor.

BACKGROUND OF THE INVENTION

Many centrifugal compressors, such as those employed in refrigeration systems, are driven by electric motors. The motor shaft is typically connected to the rotor shaft of the compressor which supports one or more impeller wheels by means of a gear train. The gear train is designed to increase the rotor speed above that of the motor shaft to obtain optimum efficiency. In refrigeration applications, single stage centrifugal compressors are generally favored because this type of single stage machine produces a large pressure ratio for the single stage of compression and it is more easily manufactured when compared to the more complex multi-stage machines.

Generally, the low speed motor shaft and the high speed impeller shaft are supported by oil lubricated hydrodynamic journal or sleeve bearings. In addition to radial loads exerted upon the shafts, gas pressures and the gearing arrangement also create relatively high axial loads upon the shafts. These axial loads require the further use of oil lubricated hydrodynamic thrust bearings to help carry the extra loading on the shafts.

Hydrodynamic bearings have higher friction losses when compared to ball and roller bearings, particularly at startup. To reduce friction losses and prevent damage at startup and coast down, hydrodynamic bearings are equipped with soft metal linings that are about 0.020" to 0.040" thick. In the case of an impeller shaft, the clearance between the impeller blades and the shroud that encompasses the impeller is oftentimes less than the thickness of the protective liner. In the case when there is damage or wear to thrust bearings that support the impeller shaft, the impeller can be displaced significantly with the shaft whereupon the impeller blades will rub against the shroud resulting in serious damage being done to the impeller. Although hydrodynamic bearings have higher power losses when compared to roller and ball bearings, they are better able to dampen out troublesome vibrations when compared to other bearings.

SUMMARY OF THE INVENTION

It is, therefore, an object of the present invention to improve centrifugal compressors and, in particular, single stage centrifugal compressors of the type employed in air conditioning and refrigeration systems.

It is a further object of the present invention to protect the impeller of a single stage centrifugal compressor from damage.

It is still a further object of the present invention to enhance the performance of a single stage centrifugal compressor of the type employed in an air conditioning or refrigeration system.

Another object of the present invention is to increase the bearing reliability of a centrifugal compressor.

Yet another object of the present invention is to reduce bearing frictional losses in a centrifugal compressor.

These and other objects of the present invention are attained by a centrifugal compressor having a low speed shaft connected to a drive motor and a high speed shaft coupled to the low speed shaft by a gear train. An impeller is mounted upon the high speed shaft and the shaft is supported upon ball and roller bearings which reduce friction losses within the machine and prevent rubbing damage to the impeller due to axial loading of the shaft. The low speed shaft is supported by oil lubricated hydrodynamic bearings which dampen vibrational stresses induced in both the interconnected low speed shaft and high speed shafts.

BRIEF DESCRIPTION OF THE DRAWING

For a further understanding of these and other objects of the invention, reference will be made to the following detailed description of the invention which is to be read in connection with the accompanying drawing, wherein.

DETAILED DESCRIPTION OF THE INVENTION

Figure 1:
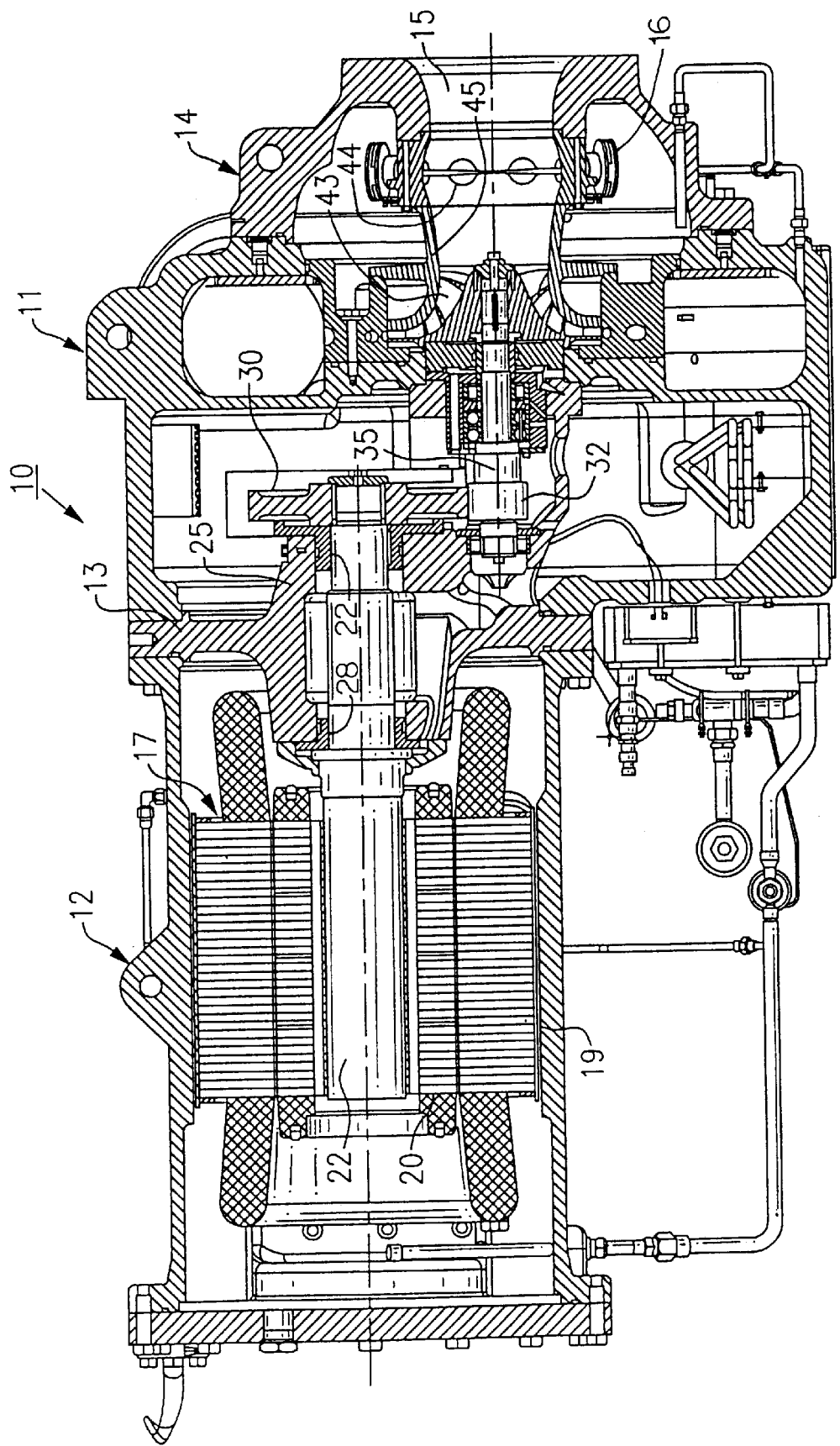
FIG. 1 is a side elevation in section illustrating a single stage centrifugal compressor embodying the teachings of the present invention.

Turning initially to FIG. 1, there is illustrated a single stage centrifugal compressor 10 of the type employed in many air conditioning and refrigeration systems embodying the teachings of the present invention. The compressor includes a main casing 11 having a motor housing 12 secured to the back of the compressor casing by any suitable means such as mounting studs and the like. The front end of the casing is closed by means of front cover 14 that contains a fluid inlet 15 through which a fluid to be compressed enters the compressor. A series of inlet guide vanes 44 are mounted in a control unit 16 positioned in the inlet to the compressor.

An electric motor generally referenced 17 is mounted within the motor housing. The motor stator windings 19 are stationarily secured to the inner wall of the motor housing and the motor rotor unit 20 is mounted upon a low speed shaft 22. The low speed shaft is mounted within the motor housing upon suitable bearings (27, 28) in a conventional manner. One end of the low speed shaft extends outwardly beyond the motor housing and passes through a bearing housing 25 that forms part of the back wall 13 of the compressor casing.

The extended end 24 of the low speed shaft is supported within spaced apart, oil lubricated, hydrodynamic bearings 27 and 28 that are arranged to take up both axial and radial loads. These types of oil lubricated bearings are well known in the art and have been used for some time to support both the low speed shaft and the high speed shaft in single stage centrifugal compressors such as the compressor illustrated in FIG. 1.

As noted above, hydrodynamic bearings of this type have higher power losses when compared to antifriction bearings containing rollers or balls. However, ball and roller bearings, up until recently, have exhibited a shorter life span than the hydrodynamic bearings. However, most hydrodynamic bearings contain a soft metal coating that surrounds the shaft and serves to reduce frictional loads on the bearings during start up and coast down. In the case of a centrifugal compressor where the high speed shaft rotatably supports the impeller within a shroud, the clearance between the impeller blades and the shroud may be less than the thickness of the bearing's soft metal coating. As a consequence, the bearings can wear to a point where the impeller blades come into rubbing contact with the shroud. This, in turn, can damage the impeller and cause compressor failure. The oil lubricated hydrodynamic bearings have one decided advantage over the low friction roller and ball bearings in that the hydrodynamic bearing provides a damping effect for the shaft, and thus absorbs vibratory stress acting upon the shaft related system.

With further regard to FIG. 1, a drive gear 30 is secured to the outboard end of the low speed shaft which protrudes outwardly from the bearing housing 25. The drive gear is arranged to mesh with a smaller diameter driven gear 32 that is secured to the compressor's high speed shaft 35. As will be explained in further detail below, the high speed shaft 35 is mounted in a pair of roller bearings 37 and 38 for taking up radial loads exerted on the high speed shaft and a pair of roller bearings 40 and 41 that are arranged to take up axial loads exerted on the high speed shaft. As is conventional, the impeller wheel contains a series of radially turned vanes 43 that form with the shroud a series of converging passages through which the fluid that is being compressed is forced as the wheel turns at high speeds. The impeller wheel is centered inside of a shroud 45 so that little clearance is provided between the impeller blades and the shroud. As noted above, the clearance between the impeller blades and the shroud is very tight and even slight wear on the bearings can cause the blades to rub against the shroud.

Figure 3:
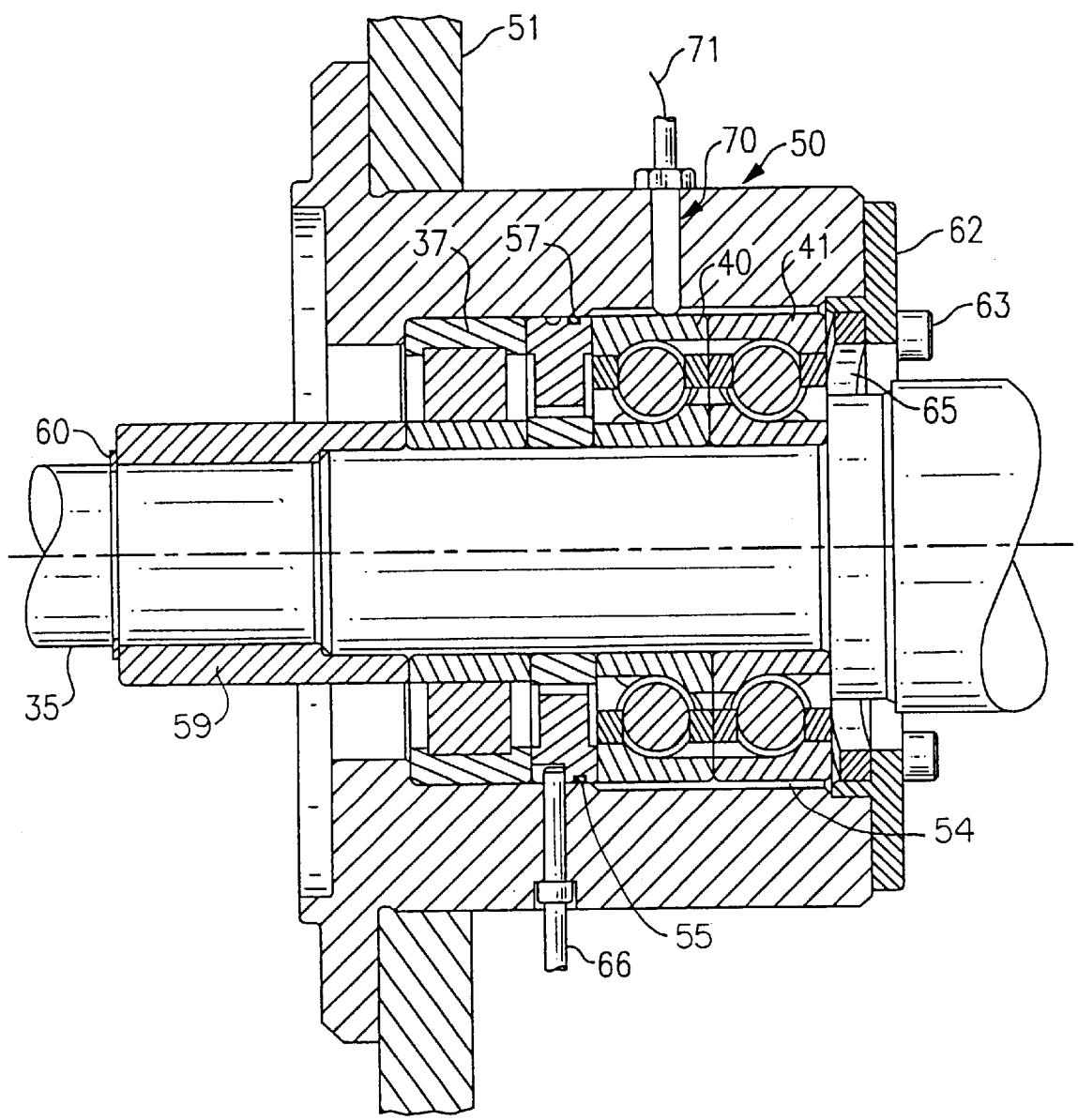
FIG. 3 is a further enlarged partial view in section illustrating the ball and roller bearing unit for supporting the high speed shaft.

Roller bearing 38 is mounted in the compressor casing and is arranged to support the distal end of the high speed shaft. As best illustrated in FIG. 3, roller bearings 37 and the two ball bearings 40 and 41 are mounted within a bearing block 50 that is secured to an intermediate vertical wall 51 of the compressor casing. Because of recent advances in roller and ball bearing materials, the bearings can be manufactured using wear resistant materials that considerably extend the usable life of the bearing when employed in high speed applications such as herein described. The two wall bearings 40 and 41 have their inner races press fitted upon the high speed shaft and are placed in side by side contact upon the shaft. The outer races of the two ball bearings are contained within a horizontally disposed cavity 54 formed in the bearing block. The cavity opens to one side of the bearing block and empties into a smaller diameter blind hole 55 at its other end. Roller bearing 37 and an oil ring 57 are mounted in the blind hole with the oil ring 57 separating roller bearing 37 and ball bearing 40 in assembly. A spacer 59 is passed over the shaft so that it can pass over the shaft into contact with roller bearing 37. The spacer is held in place by a snap ring 60 that is fitted in a groove formed in the shaft to prevent axial movement of the bearing and the oil seal to the left, not shown, as viewed in FIG. 3.

The open end of the cavity is closed by an end cap 62 that is held in place by screws 63 that are threaded into the bearing block. A spring in the form of a belville washer 65 is placed between the end cap and ball bearing 41. The spring serves to provide a preload upon the axial bearings 40 and 41, thus preventing the bearing stack from rattling, particularly during surge conditions.

Oil is provided to the stack by an oil line 66 which has a discharge port adjacent to the oil ring 57. The oil ring, in turn, is arranged to distribute the oil axially in two directions to provide lubrication to the roller bearing 37 and the ball bearing pair 40 and 41. Although not shown, an oil discharge passage is provided through which the distributed oil is able to pass out of the casing back to the oil sump.

Figure 2:
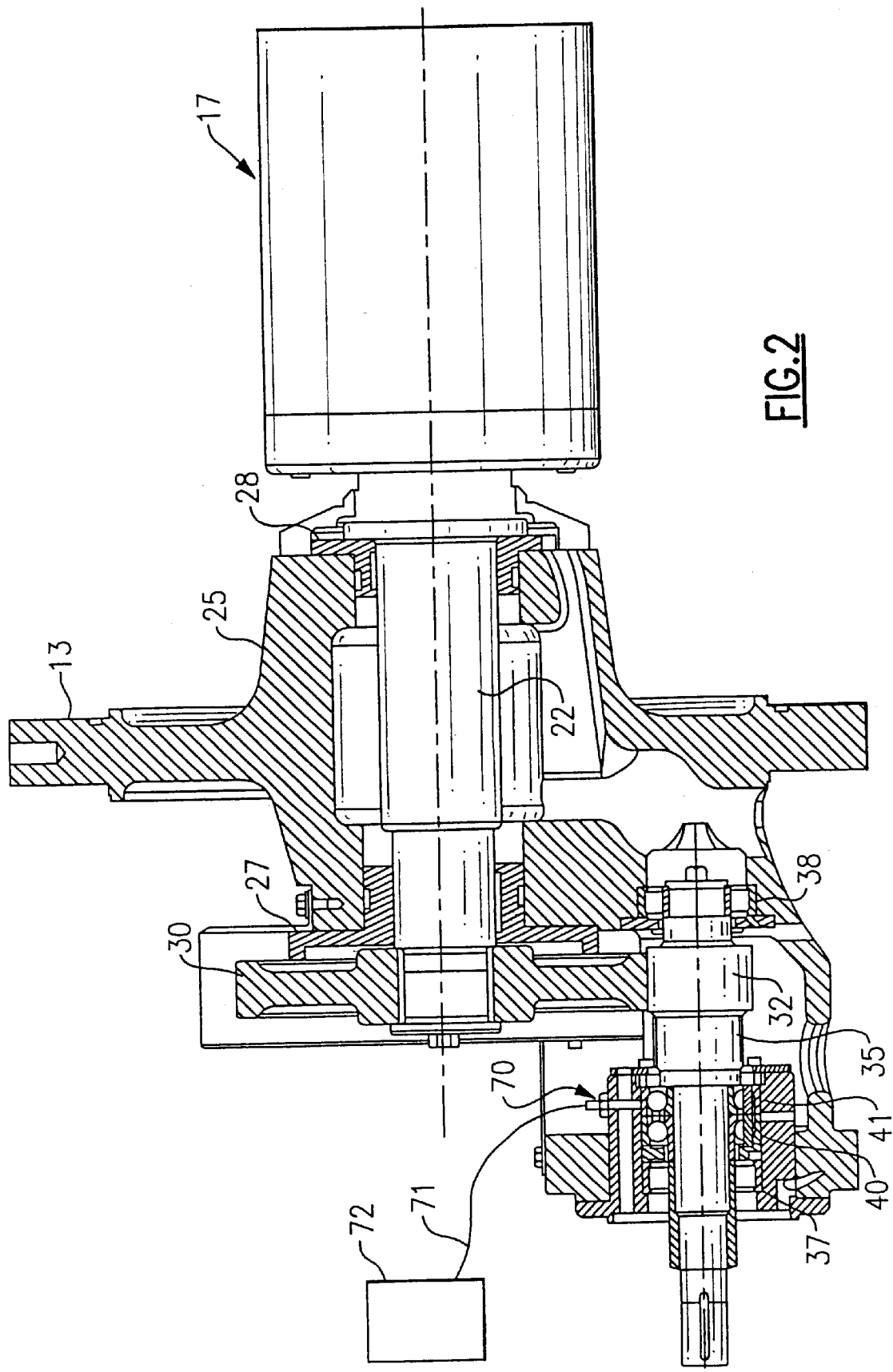
FIG. 2 is an enlarged partial sectional view illustrating the high speed and low speed shaft assemblies of the centrifugal compressor shown in FIG. 1.

A temperature sensing probe 70 is mounted within the bearing block 50 and is arranged to ride in contact with the outer race of ball bearing 40. The probe contains an outlet line 71 that provides a temperature related signal to a controller 72 (FIG. 2) which is adapted to shut down the compressor in the event an over-temperature condition is sensed. This, in turn, protects the compressor's impeller from being damaged in the event of a high-speed shaft bearing failure.

As should be evident from the disclosure above, the present hybrid bearing arrangement reduces bearing frictional losses in a centrifugal compressor as well as preventing the compressor's impeller from becoming damaged in the event of a high speed shaft bearing failure. The use of hydrodynamic bearings to support the low speed shaft provides vibration damping to the low speed shaft as well as to the high speed shaft through the gear train that couples the two shafts together in assembly.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A centrifugal compressor having at least one stage of compression that includes:
   a motor for driving a first low speed drive shaft;
   hydrodynamic bearings for supporting the low speed shaft,
   a gear train for connecting the low speed shaft to a high speed shaft whereby the high speed shaft turns at a higher speed than the low speed shaft;
   an impeller mounted for rotation upon the high speed shaft, said impeller arranged to rotate within a shroud to compress fluid drawn into said impeller;
   said high speed shaft being supported upon ball bearing means for absorbing axial loads and roller bearings for absorbing radial load acting upon said high speed shaft.

2. The centrifugal compressor of claim 1 wherein said gear train includes a driving gear secured to the low speed shaft and a driven gear secured to the high speed shaft.

3. The centrifugal compressor of claim 2 that includes a first roller bearing mounted upon the high speed shaft on a front side of said driven gear and second roller bearing mounted on the high speed shaft on a back side of said high speed shaft.

4. The centrifugal compressor of claim 3 wherein said impeller is mounted upon the high speed shaft in front of said first roller bearing.

5. The centrifugal compressor of claim 4 wherein the ball bearing means for absorbing axial loads includes a pair of ball bearings mounted in a side by side relationship upon the high speed shaft between said first roller bearing and said impeller.

6. The centrifugal compressor of claim 5 that further includes a spring means for placing a preload upon one of the ball bearings to limit unwanted vibrations on the high speed shaft in the event that the shaft experiences a surge condition.

7. The centrifugal compressor of claim 5 that further includes a spacer ring mounted between said first roller bearing and a second ball bearing in said pair.

8. The centrifugal compressor of claim 7 that further includes means for introducing oil into the space between the first roller bearing and said second ball bearing to lubricate said ball and roller bearings.

9. The centrifugal compressor of claim 5 that further includes a sensor means for sensing the temperature of at least one of said bearings mounted upon the high speed shaft.

10. The centrifugal compressor of claim 9 wherein said sensor means includes a probe that is arranged to ride in contact with an outer race of a ball bearing.

11. A centrifugal compressor that includes:

a low speed shaft connected to a motor;

a high speed shaft connected to an impeller for compressing fluid;

a gear train for connecting the low speed shaft to the high speed shaft;

oil lubricated hydrodynamic bearings for supporting the low speed shaft and damping vibrations acting on the low speed shaft and the high speed shaft which are transmitted to the low speed shaft by said gear train; and ball and roller bearings for supporting the high speed shaft.

12. The centrifugal compressor of claim 11 that further includes a bearing block for housing at least one roller bearing and a pair of ball bearings that support the high speed shaft.

13. The centrifugal compressor of claim 12 wherein said ball bearings are mounted within the bearing block in a side by side relationship and the roller bearing is separated from one of said roller bearings by an oil ring.

14. The centrifugal compressor of claim 13 that further includes a supply line for bringing oil to said oil ring and wherein said oil ring is arranged to distribute oil axially to said roller bearing and said ball bearings.

15. The centrifugal compressor of claim 14 that further includes a temperature probe for detecting the temperature of one of the bearings contained in the bearing block.

16. The centrifugal compressor of claim 15 that further includes a controller connected to said probe for shutting down said compressor in the event an over-temperature condition is detected.

* * * * *